US011534907B2

(12) United States Patent
Yamashita et al.

(10) Patent No.: US 11,534,907 B2
(45) Date of Patent: Dec. 27, 2022

(54) MANAGEMENT SYSTEM AND CONTROL METHOD

(71) Applicant: OKAMURA CORPORATION, Yokohama (JP)

(72) Inventors: Yoshikazu Yamashita, Yokohama (JP); Satoshi Asou, Yokohama (JP); Masahiko Arita, Yokohama (JP); Kenshi Watanabe, Yokohama (JP)

(73) Assignee: OKAMURA CORPORATION, Kanagawa (JP)

( * ) Notice: Subject to any disclaimer, the term of this patent is extended or adjusted under 35 U.S.C. 154(b) by 319 days.

(21) Appl. No.: 16/652,484

(22) PCT Filed: Oct. 1, 2018

(86) PCT No.: PCT/JP2018/036685
§ 371 (c)(1),
(2) Date: Mar. 31, 2020

(87) PCT Pub. No.: WO2019/069850
PCT Pub. Date: Apr. 11, 2019

(65) Prior Publication Data
US 2020/0230803 A1    Jul. 23, 2020

(30) Foreign Application Priority Data

Oct. 2, 2017    (JP) .............................. JP2017-193040

(51) Int. Cl.
| G05B 19/418 | (2006.01) |
| B25J 3/00 | (2006.01) |
| B25J 9/16 | (2006.01) |
| B25J 13/00 | (2006.01) |
(Continued)

(52) U.S. Cl.
CPC .............. *B25J 3/00* (2013.01); *B25J 9/1612* (2013.01); *B25J 9/1689* (2013.01); *B25J 13/006* (2013.01);
(Continued)

(58) Field of Classification Search
CPC . B25J 3/00; B25J 9/1612; B25J 13/006; B25J 18/00; B25J 9/1689; B25J 13/02;
(Continued)

(56) References Cited

U.S. PATENT DOCUMENTS

| 2009/0299524 A1* | 12/2009 | Evans | .................... B25J 9/1656 |
| | | | 700/248 |
| 2014/0032281 A1* | 1/2014 | Shirado | .................. G06Q 10/06 |
| | | | 705/7.42 |

(Continued)

FOREIGN PATENT DOCUMENTS

| JP | 2001-198865 | 7/2001 |
| JP | 2006-167867 | 6/2006 |

(Continued)

OTHER PUBLICATIONS

International Search Report for PCT/JP2018-036685, dated Nov. 13, 2018.

*Primary Examiner* — Harry Y Oh
*Assistant Examiner* — Sohana Tanju Khayer
(74) *Attorney, Agent, or Firm* — Nixon Peabody LLP; Jeffrey L. Costellia

(57) ABSTRACT

A management system is a management system which includes a remote work system having at least one master unit and a plurality of slave units which can be remotely operated and a management server, in which each of the plurality of slave units includes a gripping unit that is configured to grip a target, grip the target by means of autonomous control, and, when being connected to the master unit by the management server, grip the target by means of a remote operation by the master unit, the master unit is configured to perform the remote operation on the plurality of slave units, and the management server includes an operation management unit that is configured to connect (Continued)

the master unit and the plurality of slave units when a remote operation is required.

5 Claims, 13 Drawing Sheets

(51) Int. Cl.
 *B25J 18/00* (2006.01)
 *G06F 3/01* (2006.01)
 *B25J 13/02* (2006.01)
(52) U.S. Cl.
 CPC ............... *B25J 13/02* (2013.01); *B25J 18/00* (2013.01); *G06F 3/014* (2013.01); *G05B 2219/35464* (2013.01); *G05B 2219/40146* (2013.01)
(58) Field of Classification Search
 CPC .......... G06F 3/014; G05B 2219/35464; G05B 2219/40146
 See application file for complete search history.

(56) References Cited

U.S. PATENT DOCUMENTS

| | | | | |
|---|---|---|---|---|
| 2016/0325434 | A1* | 11/2016 | Lee ........................ | B25J 9/1682 |
| 2018/0154518 | A1* | 6/2018 | Rossano ................ | B25J 9/1697 |
| 2018/0243920 | A1* | 8/2018 | Hashimoto ............ | B25J 9/1602 |
| 2018/0250825 | A1* | 9/2018 | Hashimoto ............ | B25J 9/0084 |
| 2018/0284760 | A1* | 10/2018 | Gupta .................... | B25J 13/065 |
| 2019/0262992 | A1* | 8/2019 | Kim ...................... | B25J 9/1666 |
| 2019/0314097 | A1* | 10/2019 | Diolaiti .................. | A61B 17/00 |
| 2020/0215691 | A1* | 7/2020 | Saruta ................... | B25J 9/1689 |

FOREIGN PATENT DOCUMENTS

| | | |
|---|---|---|
| JP | 2009-090420 | 4/2009 |
| JP | 2012-051089 | 3/2012 |
| JP | 5940682 | 6/2016 |
| WO | WO-2012/029227 | 3/2012 |

* cited by examiner

MANAGEMENT SYSTEM AND CONTROL METHOD

TECHNICAL FIELD

The present invention relates to a management system and a control method.

Priority is claimed on Japanese Patent Application No. 2017-193040, filed Oct. 2, 2017, the content of which is incorporated herein by reference.

BACKGROUND ART

There are various robots that grip a target, such as a robot that grips a target autonomously and a robot that grips a target on the basis of a remote operation.

Patent Document 1 describes, as a related technology, a technology related to a system for automatically picking up products in a material handling facility.

CITATION LIST

Patent Literature

Patent Document 1

Japanese Patent No. 5940682

SUMMARY OF INVENTION

Technical Problem

Incidentally, a robot to be remotely operated is composed of a master unit and a slave unit. When a target is gripped by a remote operation, a combination of a connection between the master unit and the slave unit is less likely to be restricted, but, because of a high degree of freedom, there occurs a problem of how to actually manage the combination of the connection.

For this reason, in terms of reducing labor cost, there has been a demand for a technology in which one master unit is connected to a plurality of slave units and one operator can operate the plurality of slave units.

An object of the present invention is to provide a management system and a control method which can solve the problems described above.

Solution to Problem

According to a first aspect of the present invention provides a management system comprising: a remote work system having at least one master unit and a plurality of slave units, which are capable of being remotely operated, and a management server, wherein each of the plurality of slave units includes a gripping unit configured to grip a target, to grip the target by means of autonomous control, and to grip the target by means of a remote operation by the master unit when each of the plurality of slave units is connected to the master unit by the management server, the master unit is configured to perform the remote operation of the plurality of slave units, and the management server includes an operation management unit configured to connect the master unit and the plurality of slave units when a remote operation is required.

According to a second aspect of the present invention provides the management system in the first aspect, wherein, when there are two or more master units, the master units are divided into groups for each operation time zone of an operator who operates the master units, and the operation management unit connects the master units and the slave units divided into groups for each operation time zone when the remote operation is required.

According to a third aspect of the present invention provides the management system in the first or second aspect, wherein the operation management unit connects the master unit and the slave unit on the basis of an operation proficiency of an operator of the master unit.

According to a fourth aspect of the present invention provides a control method of a management system including a remote work system having at least one master unit and a plurality of slave units each including a gripping unit gripping a target, which are capable of being remotely operated, and a management server, comprising: gripping, by each of the plurality of slave units, the target by means of autonomous control; gripping, by each of the plurality of slave units, the target by means of a remote operation by the master unit when each of the plurality of slave units is connected to the master unit by the management server; performing, by the master unit, the remote operation on the plurality of slave units; and connecting, by the management server, the master unit and the plurality of slave units when a remote operation is required.

Advantageous Effects of Invention

According to the aspects of the present invention, in a management system including a remote work system having a master unit and a slave unit that can be remotely operated and a management server, it is possible to connect the master unit and the slave unit to improve work efficiency.

DESCRIPTION OF EMBODIMENTS

First Embodiment

Hereinafter, embodiments of the present invention will be described in detail with reference to the drawings.

(Configuration of Management System 1)

A configuration of a management system 1 according to a first embodiment of the present invention will be described.

Figure 1:
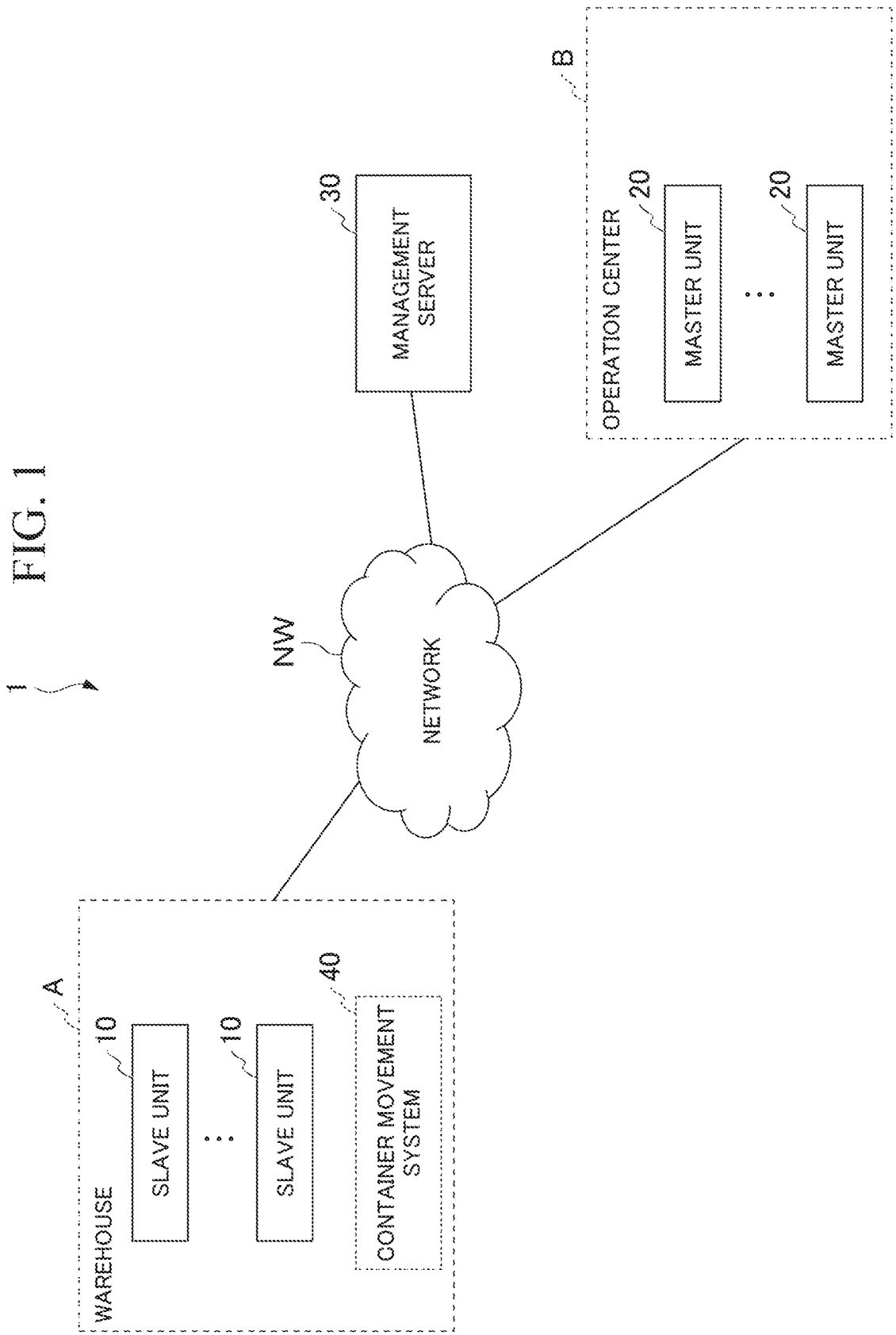
FIG. 1 is a diagram which shows an example of a configuration of a management system according to a first embodiment of the present invention.

The management system 1 according to the first embodiment of the present invention is a system which stores a connection between a slave unit 10 and a master unit 20 in association with each other. As shown in FIG. 1, the management system 1 includes a plurality of slave units 10, a plurality of master units 20, a management server 30, a container movement system 40, and a network NW.

(Configuration of Slave Unit 10)

Figure 2:
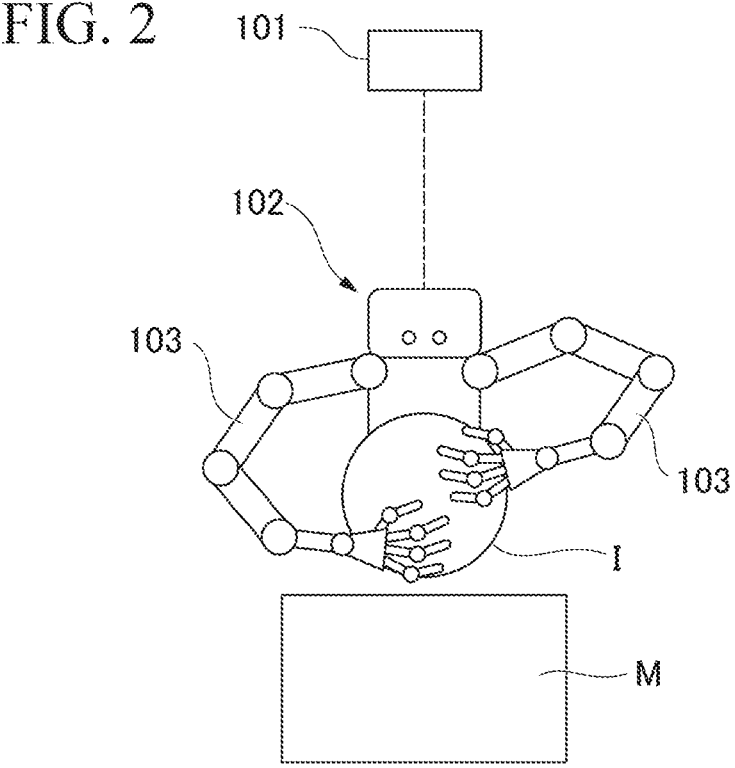
FIG. 2 is a diagram which shows an example of a configuration of a slave unit according to the first embodiment of the present invention.

The slave unit 10 is a robot disposed in a place different from the master unit 20 (a warehouse A in an example shown in FIG. 1), and operates according to a control signal received from the master unit 20 via the network NW. When the slave unit 10 receives a control signal from the master unit 20 and the slave unit 10 operates according to the control signal, the slave unit 10 and the master unit 20 constitutes a master/slave type remote work system. As shown in FIG. 2, the slave unit 10 includes a communication unit 101, a photographer 102, and a gripping unit 103.

The communication unit 101 communicates with the master unit 20 via the network NW. The communication unit 101 communicates with the master unit 20 to constitute the master/slave type remote work system with the slave unit 10 and the master unit 20.

The photographer 102 photographs a target I to be gripped. An image photographed by the photographer 102 is a three-dimensional image in which an object is three-dimensionally viewed. For example, a stereoscopic image is a stereo image composed of two images having parallax. In addition, for example, a three-dimensional image is an image formed from a three-dimensional graphic having depth information. The photographer 102 transmits the photographed image to the master unit 20 via the communication unit 101.

The gripping unit 103 operates according to a control signal received from the master unit 20 via the communication unit 101. The gripping unit 103 is, for example, a robot arm.

(Configuration of Master Unit 20)

Figure 3:
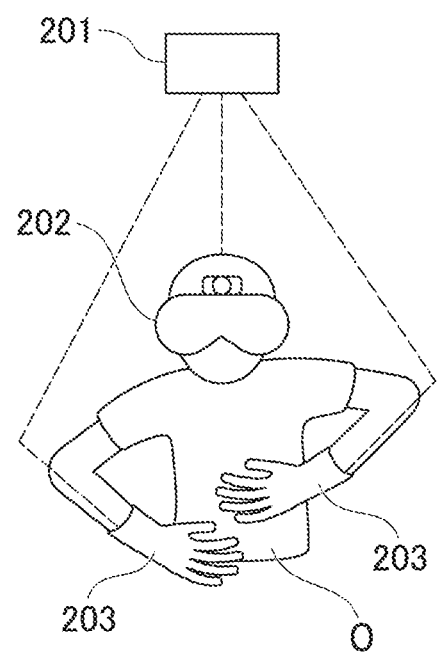
FIG. 3 is a diagram which shows an example of a configuration of a master unit according to the first embodiment of the present invention.

The master unit 20 is disposed in a place different from the slave unit 10 (an operation center B that is a workplace of an operator O in the example shown in FIG. 1), generates a control signal for causing the slave unit 10 to operate, and transmits the generated control signal to the slave unit 10. The master unit 20 includes, as shown in FIG. 3, a communication unit 201, an image reproduction unit 202, and an operation input unit 203.

The communication unit 201 communicates with the slave unit 10 and the management server 30 via the network NW.

Specifically, the communication unit 201 receives a connection instruction signal from an operation management unit 303 of the management server 30 to be described below. The connection instruction signal includes an identifier of the master unit 20 and an identifier of the slave unit 10. The communication unit 201 communicates with the slave unit 10 indicated by the received connection instruction signal.

When a combination of the master unit 20 and the slave unit 10 which perform communication is changed, each identifier is written in a storage unit together with a time of the change.

The image reproduction unit 202 receives a three-dimensional image from the slave unit 10 to be operated via the communication unit 201. The image reproduction unit 202 displays the received three-dimensional image. The image reproduction unit 202 displays, for example, the three-dimensional image in a space called a virtual reality, an augmented reality, or a mixed reality. The image reproduction unit 202 is, for example, a head mounted display.

The operation input unit 203 detects an operation performed by the operator O, and transmits a control signal in accordance with the detected operation to the slave unit 10 to be operated and the management server 30 via the communication unit 201. The operation performed by the operator O is, for example, an operation of gripping the target I and causing the target I to move to a predetermined position while viewing the three-dimensional image displayed by the image reproduction unit 202. The predetermined position is, for example, a position for moving the target I to a process of packing the target I for delivery.

(Configuration of Management Server 30)

Figure 4:
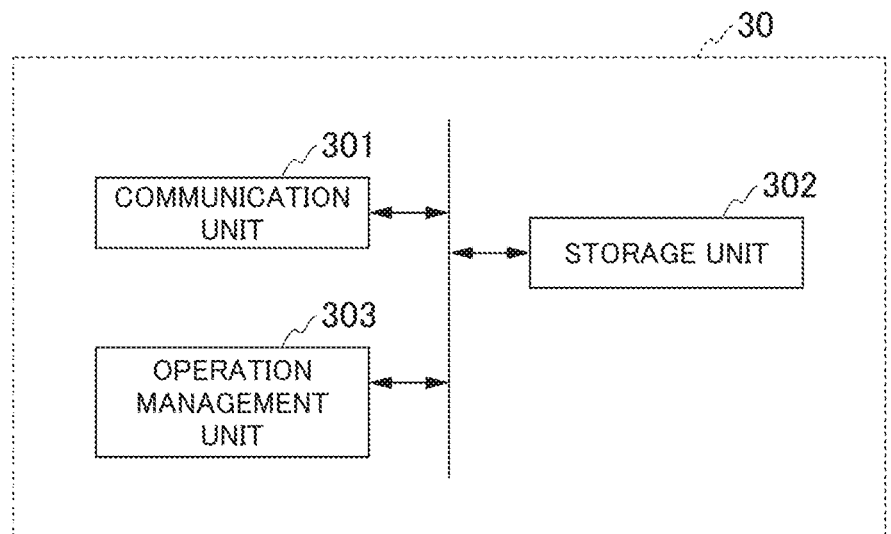
FIG. 4 is a diagram which shows an example of a configuration of a management server according to the first embodiment of the present invention.

As shown in FIG. 4, the management server 30 includes a communication unit 301, a storage unit 302, and an operation management unit 303.

The communication unit 301 communicates with the master unit 20 and the container movement system 40 via the network NW.

The storage unit 302 stores operation proficiency that indicates a technical level of gripping specified on the basis of a predetermined test or the like and an operator having the operation proficiency in association with each other. In addition, the storage unit 302 stores a combination of the master unit 20 and the slave unit 10 connected via the network NW in association with respective identifiers. When the combination of the master unit 20 and the slave unit 10 performing communication is changed, the storage unit 302 stores respective identifiers together with a time of the change.

The operation management unit 303 switches among the master units 20 that control the slave unit 10 on the basis of a state of the target I that the slave unit 10 to be operated needs to grip.

Specifically, the state of the target I is a degree of difficulty in the operation of gripping the target I. The operation management unit 303 connects the slave unit 10 to the master unit 20 operated by the operator O with high operation proficiency when it is determined that the target I is difficult for the slave unit 10 to grip.

(Configuration of Container Movement System 40)

Figure 5:
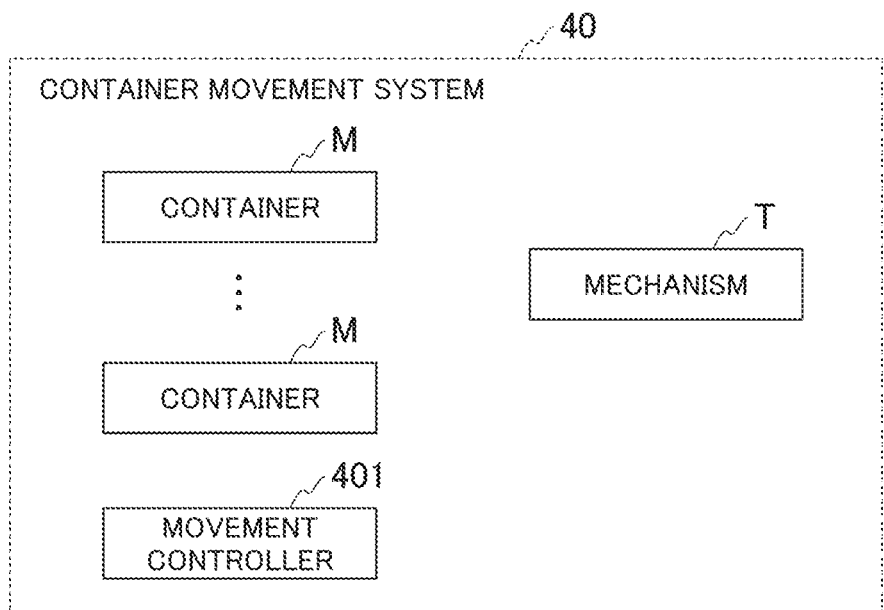
FIG. 5 is a diagram which shows an example of a configuration of a container movement system according to the first embodiment of the present invention.

As shown in FIG. 5, the container movement system 40 includes a movement controller 401, a plurality of containers M, and a mechanism T for causing each container M to move in the warehouse A. The target I is stored in the container M.

If the connection instruction signal is received, the movement controller 401 specifies a connection destination of the master unit 20 included in the received connection instruction signal. The movement controller 401 performs control to cause the container M to move to a position of the slave unit 10 that is the specified connection destination of the master unit 20 using the mechanism T.

(Processing of Management System 1)

Next, processing of the management system 1 according to the first embodiment of the present invention will be described.

Figure 6:
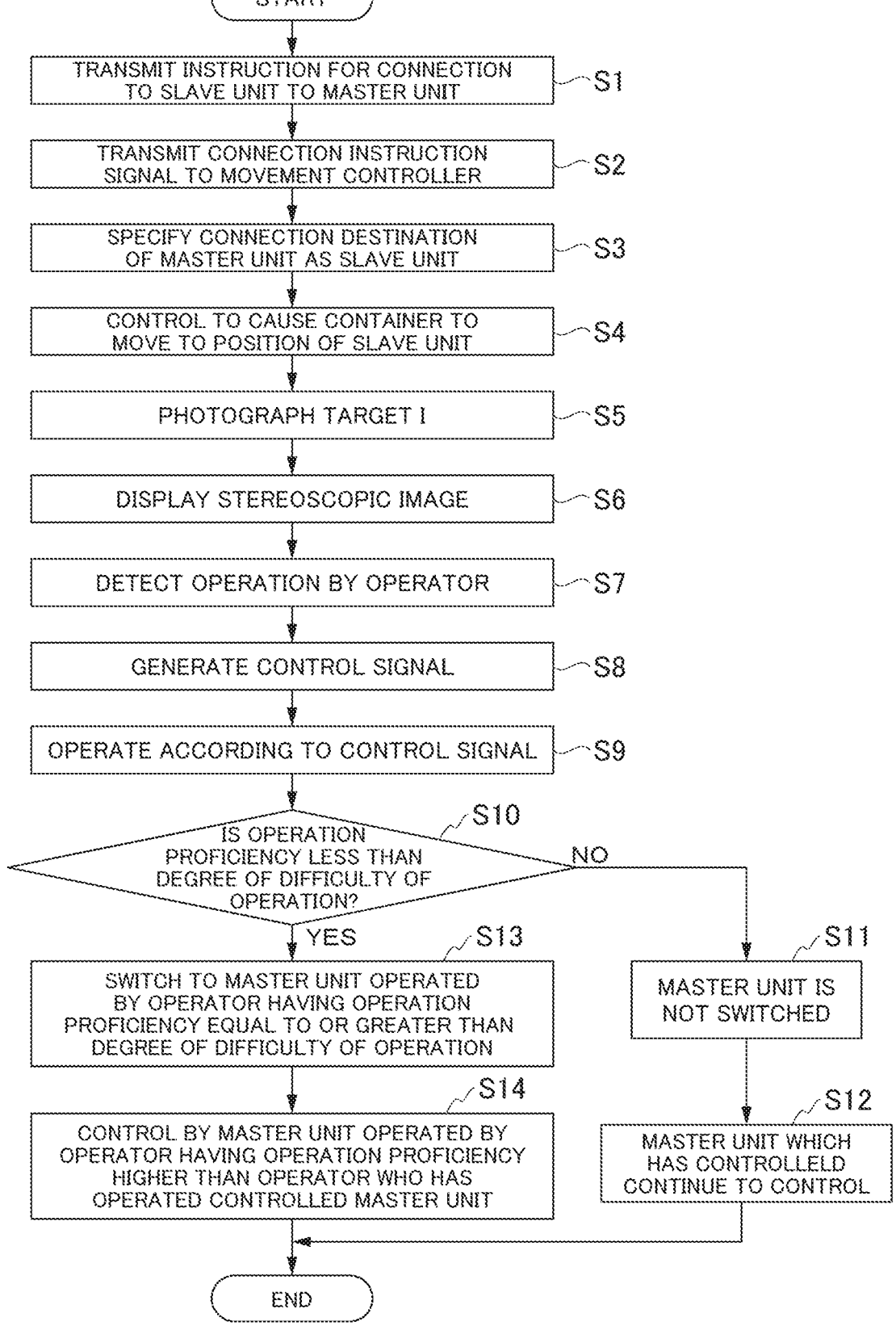
FIG. 6 is a diagram which shows an example of a processing flow of the management system according to the first embodiment of the present invention.

Here, a processing flow of the management system 1 according to the first embodiment of the present invention shown in FIG. 6 will be described.

The operation management unit 303 transmits a connection instruction signal SG to be connected to the slave unit 10 that is an operation target to the master unit 20 associated with the slave unit 10 in the storage unit 302 (step S1). In addition, at this time, the operation management unit 303 transmits this connection instruction signal SG to the movement controller 401 (step S2).

If the connection instruction signal SG is received from the management server 30, the movement controller 401 specifies the connection destination of the master unit 20 included in the received connection instruction signal SG as the slave unit 10 to be operated (step S3).

Here, for example, it is assumed that a purchase applicant P has performed a procedure for purchasing the target I at a shopping site.

The movement controller 401 performs control to cause the container M storing the target I to move to the position of the slave unit 10 in accordance with the procedure from the purchase applicant P (step S4).

The container M moves up to the position of the slave unit 10.

The photographer 102 photographs the target I stored in the container M (step S5). The photographer 102 transmits a photographed three-dimensional image to the master unit 20 and the management server 30 via the communication unit 101.

The image reproduction unit 202 receives the three-dimensional image from the photographer 102 via the communication unit 201. The image reproduction unit 202 displays the received three-dimensional image (step S6).

The operator O performs the operation of gripping the target I and causing it to move to a predetermined position while viewing the three-dimensional image displayed by the image reproduction unit 202 on the operation input unit 203.

The operation input unit 203 detects an operation performed by the operator O (step S7). The operation input unit 203 generates a control signal in accordance with the detected operation performed by the operator O (step S8). The operation input unit 203 transmits the generated control signal to the slave unit 10 and the management server 30. The operation input unit 203 generates a control signal in real time in accordance with an operation performed by the operator O and transmits the generated control signal to the slave unit 10 and the management server 30 each time it is generated.

The gripping unit 103 receives a control signal from the operation input unit 203. The gripping unit 103 operates according to the received control signal (step S9). When the gripping unit 103 intends to grip the target I according to the control signal, as described below, the target I can be gripped or cannot be gripped according to the degree of difficulty in operating of the target I and the operation proficiency of each operator.

The operation management unit 303 switches among the master units 20 that control the slave unit 10 on the basis of the state of the target I that the slave unit 10 to be operated needs to grip. For example, the state of the target I is a degree of difficulty in the operation of gripping the target I.

Specifically, the operation management unit 303 determines whether the target I that the slave unit 10 intends to grip is a target difficult to grip. More specifically, a shape of the target I, a posture of the target I when it is gripped, and a degree of difficulty in the operation determined in advance in accordance with the shape and posture are recorded in the storage unit in association with each other. The operation management unit 303 specifies a shape and a posture of the target I that match the shape and posture of the target I when it is actually gripped within an error range among shapes and postures of the targets I stored in the storage unit. The operation management unit 303 specifies the degree of difficulty in the operation associated with the specified shape and posture in the storage unit. The operation management unit 303 compares the operation proficiency of each operator with the specified degree of difficulty in the operation, and determines whether the operation proficiency is less than the degree of difficulty in the operation (step S10). The operation management unit 303 determines that the target I is easy for the slave unit 10 to grip when it is determined that the operation proficiency is equal to or greater than the degree of difficulty in the operation. In addition, the operation management unit 303 determines that the target I is difficult for the slave unit 10 to grip when it is determined that the operation proficiency is less than the degree of difficulty in the operation. The operation proficiency indicates the degree of difficulty in the operation of an operator.

When it is determined that the operation proficiency is equal to or greater than the degree of difficulty in the operation (NO in step S10), the operation management unit 303 does not switch among the master units 20 that control the slave unit 10 (step S11).

The master unit 20 which has controlled the slave unit 10 continues to control the slave unit 10 (step S12).

When it is determined that the operation proficiency is less than the degree of difficulty in the operation (YES in step S10), the operation management unit 303 switches the master unit 20 that controls the slave unit 10 to a master unit 20 being operated by an operator having an operation proficiency equal to or greater than the degree of difficulty in the operation (step S13).

Instead of the master unit 20 that has controlled the slave unit 10, a master unit 20 which has operated by an operator O having a higher operation proficiency than the operator O who has operated the master unit 20 operates the slave unit 10 (step S14).

As described above, the management system 1 according to the first embodiment of the present invention has been described.

The management system 1 according to the first embodiment of the present invention includes a remote work system having a master unit 20 and a slave unit 10 which can be remotely operated, and a management server 30. In the management system 1, the slave unit 10 is disposed in a warehouse A and grips the target I. The master unit 20 is disposed in an operation center B different from the warehouse A and remotely operates the slave unit 10. The management server 30 includes an operation management unit 303 that switches among the master units 20 controlling the slave unit 10 on the basis of the state of the target I to be gripped by the slave unit 10. The operation management unit 303 determines whether the target I is difficult for the slave unit 10 to grip. Specifically, a shape of the target I, a posture of the target I when it is gripped, and a degree of difficulty in the operation determined in advance in accordance with the shape and posture are recorded in the storage unit in association with each other. The operation management unit 303 specifies a shape and a posture of the target I that match the shape and posture of the target I when it is actually gripped among the shapes and postures of the targets I stored in the storage unit. The operation management unit 303 specifies the degree of difficulty in the operation associated with the specified shape and posture. The operation management unit 303 compares the operation proficiency of each operator with the specified degree of difficulty in the operation, and determines that the target I is easy for the slave unit 10 to grip when it is determined that the operation proficiency is equal to or greater than the degree of difficulty in the operation. In addition, the operation management unit 303 compares the operation proficiency of each operator with the specified degree of difficulty in the operation, and determines that the target I is difficult for the slave unit 10 to grip when it is determined that the operation proficiency is less than the degree of difficulty in the operation.

In this manner, among operations of gripping the target I, work whose degree of difficulty in the operation exceeds the operation proficiency can be assigned to an operator whose operation proficiency is higher than the degree of difficulty in the operation. Therefore, the management system 1 according to the first embodiment of the present invention can connect the master unit 20 and the slave unit 10 to reduce wasted time in which the operation cannot be performed, that is, to improve work efficiency.

Second Embodiment (Configuration of Management System 1)

A configuration of a management system 1 according to a second embodiment of the present invention will be described.

When it is determined that a distance from the target I to the slave unit 10 is long, the management system 1 according to the second embodiment of the present invention changes the connection destination of the master unit 20 to a slave unit 10 closer to the target I. The management system 1 according to the second embodiment of the present invention, like the management system 1 according to the first embodiment of the present invention, includes the plurality of slave units 10, the plurality of master units 20, the management server 30, the container movement system 40, and the network NW (Configuration of Management Server 30)

The management server 30 according to the second embodiment of the present invention, like the management server 30 according to the first embodiment of the present invention, includes the communication unit 301, the storage unit 302, and the operation management unit 303.

The operation management unit 303 switches among the master units 20 that control the slave unit 10 on the basis of a state of the target I gripped by the slave unit 10.

Specifically, the state of the target I is a distance from the target I to the slave unit 10. When a distance from the target I to the slave unit 10 is shorter than a current distance, that is, when it is determined that there is a slave unit 10 closer to the target I, the operation management unit 303 changes the connection destination of the master unit 20 to a slave unit 10 closer to the target I.

(Processing of Management System 1)

Next, processing of the management system 1 according to the second embodiment of the present invention will be described.

Figure 7:
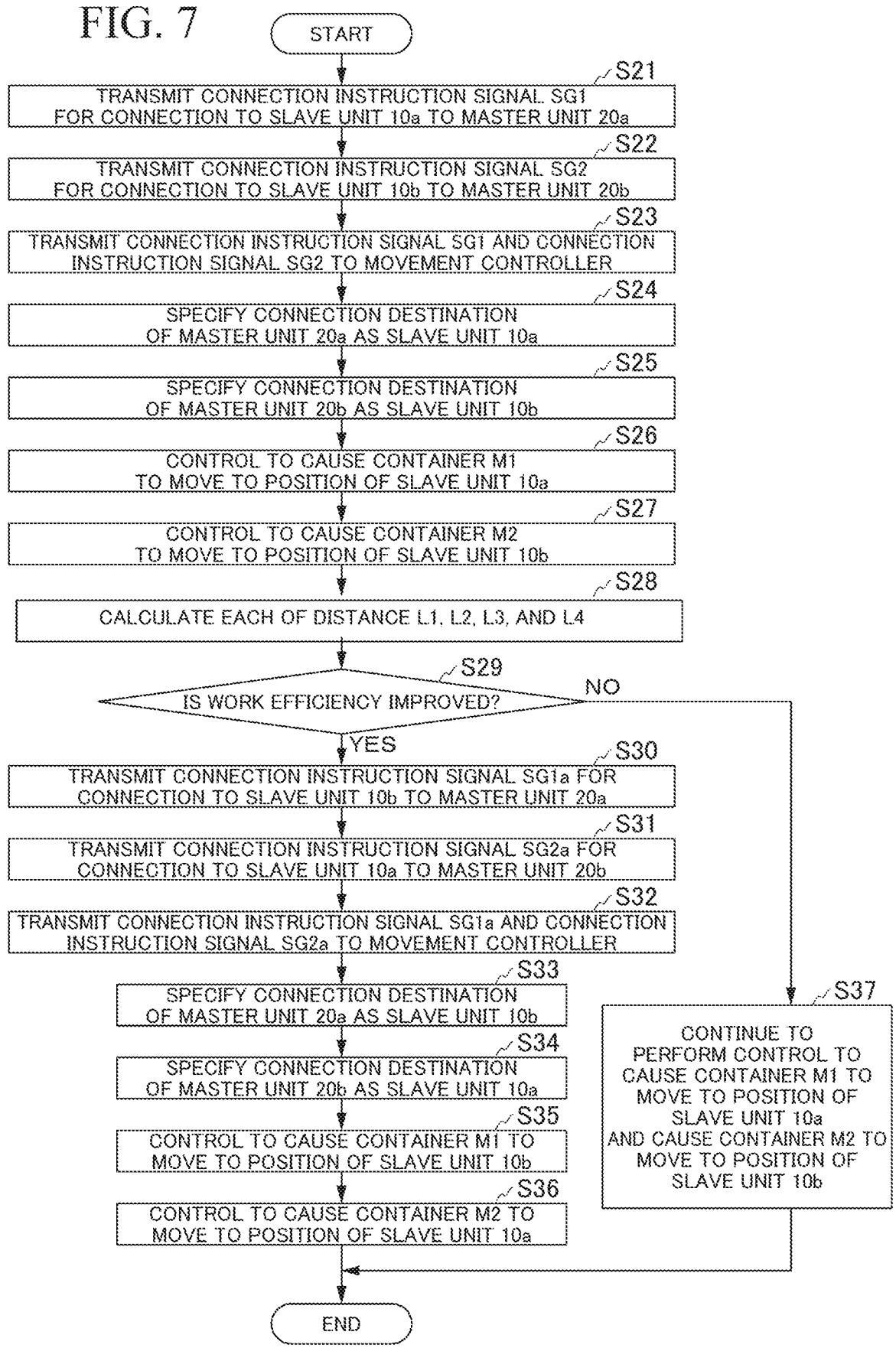
FIG. 7 is a diagram which shows an example of a processing flow of a management system according to a second embodiment of the present invention.

Here, a processing flow of the management system 1 according to the second embodiment of the present invention shown in FIG. 7 will be described.

In the description herein, one target I is referred to as a target I1 and another target I different from the target I1 is referred to as a target I2 to distinguish the targets I.

In addition, one container M is referred to as a container M1 and another container M different from the container M1 is referred to as a container M2 to distinguish the containers M. Moreover, one purchase applicant P is referred to as a purchase applicant P1 and another purchase applicant P different from the purchase applicant P1 is referred to as a purchase applicant P2 to distinguish the purchase applicants P. Moreover, one operator O is referred to as an operator O1 and another operator O different from the operator O1 is referred to as an operator O2 to distinguish the operators O. Moreover, one slave unit 10 is referred to as a slave unit 10a and another slave unit 10 different from the slave unit 10a is referred to as a slave unit 10b to distinguish the slave units 10. Furthermore, one master unit 20 is referred to as a master unit 20a and another master unit 20 different from the master unit 20a is referred to as a master unit 20b to distinguish the master units 20.

The operation management unit 303 transmits a connection instruction signal SG1 instructing a connection to the slave unit 10a to the master unit 20a (step S21). In addition, the operation management unit 303 transmits a connection instruction signal SG2 instructing a connection to the slave unit 10b to the master unit 20b (step S22). In addition, the operation management unit 303 transmits the connection instruction signal SG1 and the connection instruction signal SG2 to the movement controller 401 at this time (step S23).

The movement controller 401 specifies a connection destination of the master unit 20a as the slave unit 10a when the connection instruction signal SG1 is received (step S24). In addition, the movement controller 401 specifies a connection destination of the master unit 20b as the slave unit 10b when the connection instruction signal SG2 is received (step S25).

Here, for example, it is assumed that the purchase applicant P1 has performed a procedure for purchasing the target I1 at a shopping site. In addition, it is assumed that the purchase applicant P2 has performed a procedure for purchasing the target I2 at the same shopping site at substantially the same time.

The movement controller 401 performs control to cause the container M1 storing the target I1 to move to a position of the slave unit 10a in accordance with the procedure from the purchase applicant P1 (step S26). In addition, the movement controller 401 performs control to cause the container M2 storing the target I2 to move to a position of the slave unit 10b in accordance with the procedure from the purchase applicant P2 (step S27).

The movement controller 401 performs the control to cause the container M1 to move to the position of the slave unit 10a and holds information on a current position of the container M1 and the position of the slave unit 10a. In addition, the movement controller 401 performs the control to cause the container M2 to move to the position of the slave unit 10*b* and holds information on a current position of the container M2 and the position of the slave unit 10*b*. For this reason, the movement controller 401 can calculate each of a distance L1 from the container M1 to the slave unit 10*a*, a distance L2 from the container M2 to the slave unit 10*b*, a distance L3 from the container M1 to the slave unit 10*b*, and a distance L4 from the container M2 to the slave unit 10*a*. The distances calculated by the movement controller 401 are preferably movement distances in routes in which each of the container M1 and the container M2 actually moves, but may also be straight-line distances or the shortest distances in moving routes if they are difficult to calculate.

The movement controller 401 calculates each of the distance L1, the distance L2, the distance L3, and the distance L4 (step S28). The movement controller 401 transmits information including the calculated distance L1, distance L2, distance L3, and distance L4 to the management server 30.

The operation management unit 303 receives the information including the distance L1, the distance L2, the distance L3, and the distance L4 from the container movement system 40.

The operation management unit 303 specifies the distance L1, the distance L2, the distance L3, and the distance L4 included in the received information.

The operation management unit 303 determines whether a work efficiency is improved when a movement destination of the container M1 is changed from the slave unit 10*a* to the slave unit 10*b* and a movement destination of the container M2 is changed from the slave unit 10*b* to the slave unit 10*a* (step S29).

Specifically, the operation management unit 303 calculates a sum L12 of the distance L1 and the distance L2 and a sum L34 of the distance L3 and the distance L4. The operation management unit 303 compares the sum L12 with the sum L34. The operation management unit 303 determines that the work efficiency is improved when the sum L34 is less than the sum L12. In addition, the operation management unit 303 determines that the work efficiency is not improved when the sum L34 is equal to or greater than the sum L12. This determination is based on an idea that the work efficiency will be improved as the sum of distance is decreased and the movement distance is shorter.

When it is determined that the work efficiency is improved (YES in step S29), the operation management unit 303 transmits a connection instruction signal SG1*a* for switching a control target of the master unit 20*a* from the slave unit 10*a* to the slave unit 10*b* to the master unit 20*a* (step S30). In addition, the operation management unit 303 transmits a connection instruction signal SG2*a* for switching a control target of the master unit 20*b* from the slave unit 10*b* to the slave unit 10*a* to the master unit 20*b* (step S31). Moreover, the operation management unit 303 transmits the connection instruction signal SG1*a* and the connection instruction signal SG2*a* to the movement controller 401 (step S32).

The movement controller 401 specifies the connection destination of the master unit 20*a* as the slave unit 10*b* when the connection instruction signal SG1*a* is received (step S33). In addition, the movement controller 401 specifies the connection destination of the master unit 20*b* as the slave unit 10*a* when the connection instruction signal SG2*a* is received (step S34).

The movement controller 401 performs control to cause the container M1 storing the target I1 to move to the position of the slave unit 10*b* (step S35). In addition, the movement controller 401 performs control to cause the container M2 storing the target I2 to move to the position of the slave unit 10*a* (step S36).

Moreover, when the operation management unit 303 determines that the work efficiency is not improved (NO in step S29), the movement controller 401 continues to perform control to cause the container M1 to move to the position of the slave unit 10*a* and to cause the container M2 to move to the position of the slave unit 10*b* (step S37).

Figure 8:
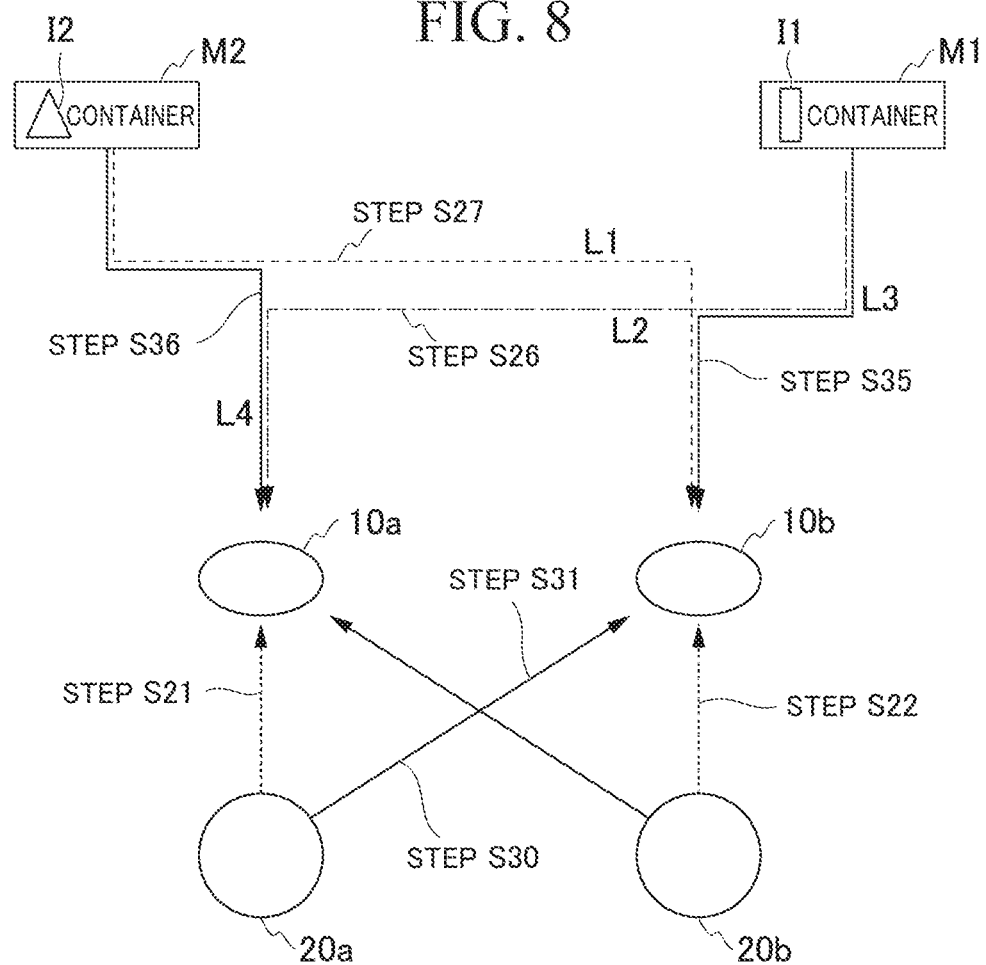
FIG. 8 is an image view of processing of the management system according to the second embodiment of the present invention.

FIG. 8 shows an image view of processing of the management system 1 according to the second embodiment of the present invention described above.

When the master unit 20*a* is connected to the slave unit 10*a* in step S21 and the master unit 20*b* is connected to the slave unit 10*b* in step S22, the container M1 needs to move the distance L1 as shown by a broken line in step S26. In addition, in this case, the container M2 also needs to move the distance L2 as shown by a broken line in step S27. Therefore, a connection destination of the master unit 20*a* is changed to the slave unit 10*b* in step S30, and a connection destination of the master unit 20*b* is changed to the slave unit 10*a* in step S31, and thereby a sum of a movement distance L3 of the container M1 and a movement distance L4 of M2 can be shorter than a sum of the distance L1 and the distance L2 as shown by solid lines in step S35 and step S36.

As a result, the management system 1 can shorten a movement distance and working time, thereby improving work efficiency, and also improving energy efficiency due to shortened movement time.

As described above, the management system 1 according to the second embodiment of the present invention has been described.

The management system 1 according to the second embodiment of the present invention includes the remote work system having the master unit 20 and the slave unit 10 which can be remotely operated, and the management server 30. In the management system 1, the slave unit 10 is disposed in the warehouse A and grips the target I. The master unit 20 is disposed in the operation center B different from the warehouse A and remotely operates the slave unit 10. The management server 30 includes the operation management unit 303 that switches among the master units 20 that control the slave unit 10 on the basis of the state of the target I to be gripped by the slave unit 10. When it is determined that a distance from the target I to the slave unit 10 is long, the operation management unit 303 changes the connection destination of the master unit 20 to a slave unit 10 closer to the target I.

In this manner, the management system 1 according to the second embodiment of the present invention can shorten work time, thereby improving work efficiency, and also improving energy efficiency due to shortened movement time.

Third Embodiment (Configuration of Management System 1)

A configuration of a management system 1 according to a third embodiment of the present invention will be described.

In the management system 1 according to the third embodiment of the present invention, operators located in various places are divided into a plurality of groups according to a time zone (hereinafter, referred to as an "operation time zone") of an area in which the slave unit 10 is operated. The management system 1 connects master units 20 operated by the operators divided into groups corresponding to each operation time zone to the slave unit 10 for each operation time zone. The management system 1 is a system that secures a labor force by employing operators located in various places in an operation time zone during which it is difficult to secure a labor force.

Figure 9:
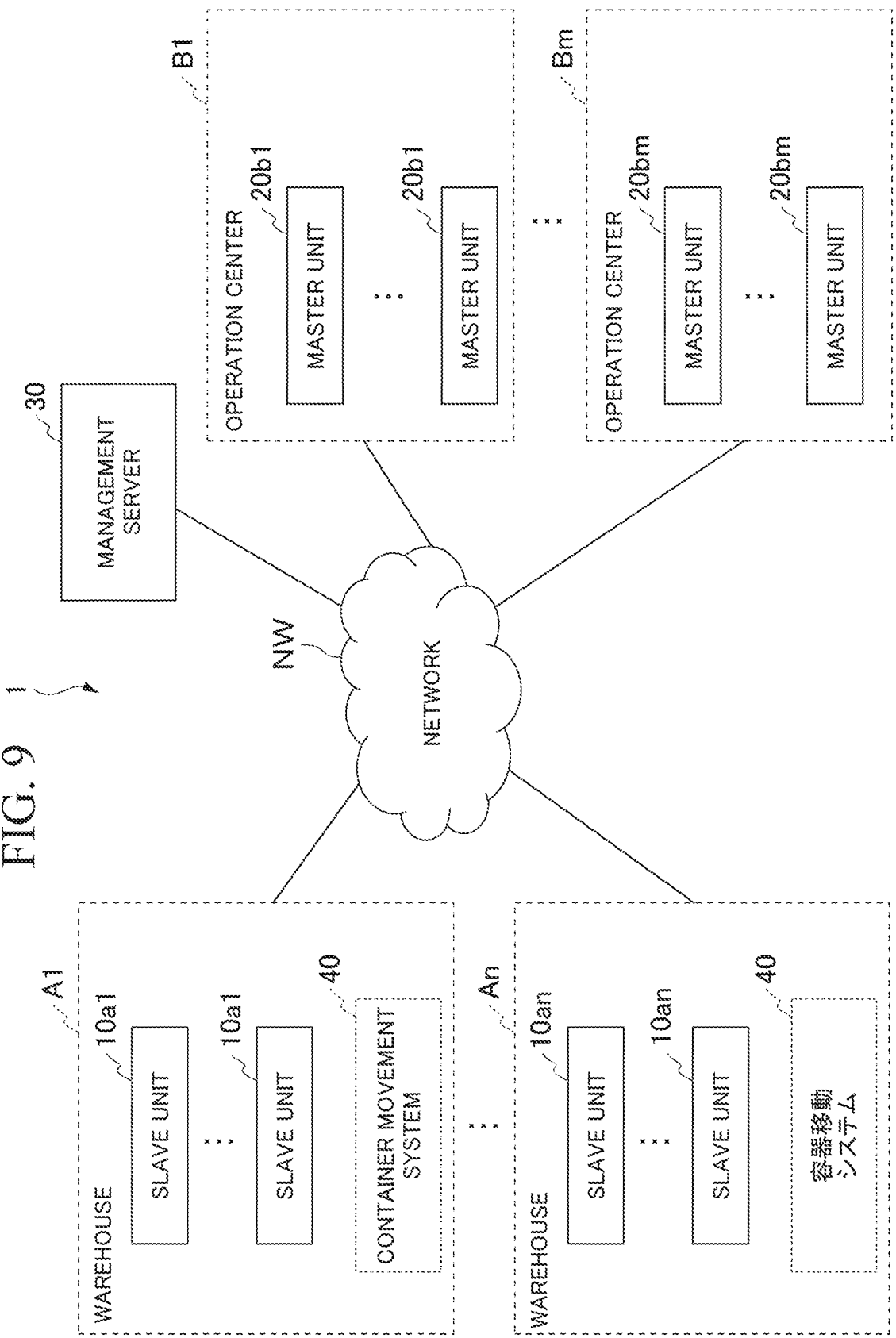
FIG. 9 is a diagram which shows an example of a configuration of a management system according to a third embodiment of the present invention.

The management system 1, as shown in FIG. 9, includes a plurality of slave units 10a1 to 10an, a plurality of master units 20b-1 to 20bm, the management server 30, the container movement system 40, and the network NW. Each of the slave units 10a1 to 10an has the same configuration, and the slave units 10a1 to 10an are collectively referred to as the slave unit 10a. In addition, each of the master units 20b1 to 20bm has the same configuration, and the master units 20b1 to 20bm are collectively referred to as the master unit 20b.

(Configuration of Slave Unit 10a)

Each slave unit 10a1 is a robot disposed in a place different from the master unit 20b (a warehouse A1 in the example shown in FIG. 9). In addition, each slave unit 10an is a robot disposed in a place different from the master unit 20b (a warehouse An in the example shown in FIG. 9).

Each slave unit 10a grips the target I by means of semi-autonomous control, and causes the gripped target I to move to a predetermined position. Here, in the semi-autonomous control, control is performed on the basis of a determination performed by artificial intelligence AI or the like in accordance with input information such as image information when a remote operation is not required, and control is performed according to an operation performed by an operator when a remote operation is required. When a remote operation is required is when it is determined that a movement of the target I is difficult. When a remote operation is not required is when the slave unit 10a grips the target I and it is determined that the target I can be moved to a predetermined position.

When there is a slave unit 10a which has difficulty moving the target I among the plurality of slave units 10a, the master unit 20b is connected to the slave unit 10a which has difficulty moving the target I via the network NW. The slave unit 10a to which the master unit 20b is connected operates according to a control signal received from the master unit 20b via the network NW. When the slave unit 10a receives a control signal from the master unit 20b, and the slave unit 10a operates according to this control signal, the slave unit 10a and the master unit 20b constitute the master/slave type remote work system.

Figure 10:
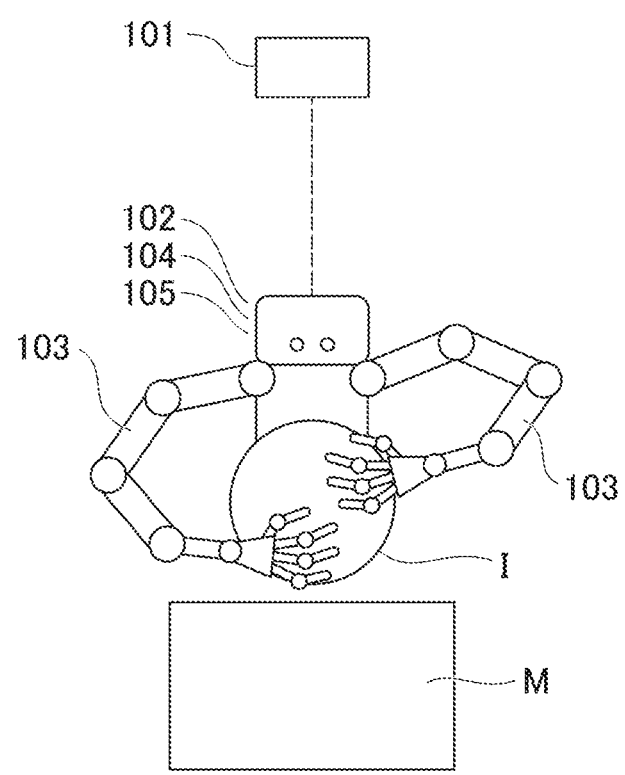
FIG. 10 is a diagram which shows an example of a configuration of a slave unit according to the third embodiment of the present invention.

The slave unit 10a includes, as shown in FIG. 10, the communication unit 101, the photographer 102, the gripping unit 103, a semi-autonomous controller 104, and a remote operation requiring detection unit 105.

The communication unit 101 communicates with the master unit 20b via the network NW. The communication unit 101 communicates with the master unit 20b to constitute the master/slave type remote work system with the slave unit 10a and the master unit 20b.

The photographer 102 photographs the target I to be gripped. An image photographed by the photographer 102 is a three-dimensional image in which an object is three-dimensionally viewed. The photographer 102 transmits the photographed image to the master unit 20b via the communication unit 101.

The gripping unit 103 operates according to a control signal received from the semi-autonomous controller 104 when a remote operation is not required. In addition, the gripping unit 103 operates according to a control signal received from the master unit 20b via the communication unit 101 when a remote operation is required.

The semi-autonomous controller 104 generates, for example, a control signal according to processing based on artificial intelligence AI in accordance with the input information such as image information and outputs the generated control signal to the gripping unit 103 when a remote operation is not required.

The remote operation requiring detection unit 105 detects that the gripping unit 103 has difficulty moving the target I. Specifically, the remote operation requiring detection unit 105 specifies a position of the gripping unit 103 and a position of the target I in the image photographed by the photographer 102. Then, the remote operation requiring detection unit 105 determines whether a relative distance between the position of the gripping unit 103 and the position of the target I is equal to or greater than a threshold value for determining that the target I is not gripped until the target I reaches a predetermined position. The remote operation requiring detection unit 105 determines that a movement of the target I is difficult, that is, a remote operation is required (when a remote operation is required) when it is determined that the relative distance between the position of the gripping unit 103 and the position of the target I is equal to or greater than the threshold value. In addition, the remote operation requiring detection unit 105 determines that a remote operation is not required when it is determined that the relative distance between the position of the gripping unit 103 and the position of the target I is less than the threshold value.

The remote operation requiring detection unit 105 transmits the identifier of the slave unit 10a requiring a remote operation to the management server 30 via the communication unit 101 when it is determined that a remote operation is required.

(Configuration of Master Unit 20b)

Each master unit 20b1 is disposed in a place different from the slave unit 10a (an operation center B1 that is a workplace of an operator Ob1 in the example shown in FIG. 9). In addition, each master unit 20bn is disposed in a place different from the slave unit 10a (an operation center Bn that is a workplace of an operator Obm in the example shown in FIG. 9). In the following description, the operators Ob1 to Obm are collectively referred to as an operator Ob.

One of the plurality of master units 20b transmits a control signal to the slave unit 10a requiring a remote operation via the network NW when the remote operation is required.

Each master unit 20b, like the master unit 20 according to the first embodiment of the present invention, includes the communication unit 201, the image reproduction unit 202, and the operation input unit 203.

The communication unit 201 communicates with the slave unit 10a and the management server 30 via the network NW.

When a combination of the master unit 20b and the slave unit 10a performing communication is changed, respective identifiers are stored together with a time of the change.

The image reproduction unit 202 receives a three-dimensional image from the slave unit 10a to be operated via the communication unit 201. In addition, the image reproduction unit 202 receives a remote operation requiring notification signal from the management server 30 via the communication unit 201 when the remote operation requiring detection unit 105 determines that a remote operation is required.

The image reproduction unit 202 displays the received three-dimensional image. In addition, the image reproduction unit 202 displays that a remote operation is required for the slave unit 10a when a remote operation requiring notification signal is received from the management server 30 via the communication unit 201.

The operation input unit 203 detects an operation performed by the operator Ob, and transmits a control signal in accordance with the detected operation to the slave unit 10a to be operated and the management server 30 via the communication unit 201.

(Configuration of Management Server 30)

The management server 30, like the management server 30 according to the first embodiment of the present invention, includes the communication unit 301, the storage unit 302, and the operation management unit 303.

The communication unit 301 communicates with the master unit 20b and the container movement system 40 via the network NW.

The storage unit 302 stores each time zone and the identifiers of master units 20b operated by the operators divided into groups corresponding to each time zone in association with each other. In addition, the storage unit 302 stores the combination of the master unit 20b and the slave unit 10a connected via the network NW in association with respective identifiers. When the combination of the master unit 20b and the slave unit 10a performing communication is changed, the storage unit 302 stores respective identifiers together with a time of the change.

The operation management unit 303 has a timer function, and switches among the master units 20b that control the slave unit 10a for each operation time zone. Specifically, the operation management unit 303 switches the master unit 20b that controls the slave unit 10a when a remote operation is required to a master unit 20b operated by an operator divided in a group corresponding to a corresponding operation time zone for each operation time zone.

(Processing of Management System 1)

Next, processing of the management system 1 according to the third embodiment of the present invention will be described.

Figure 11:
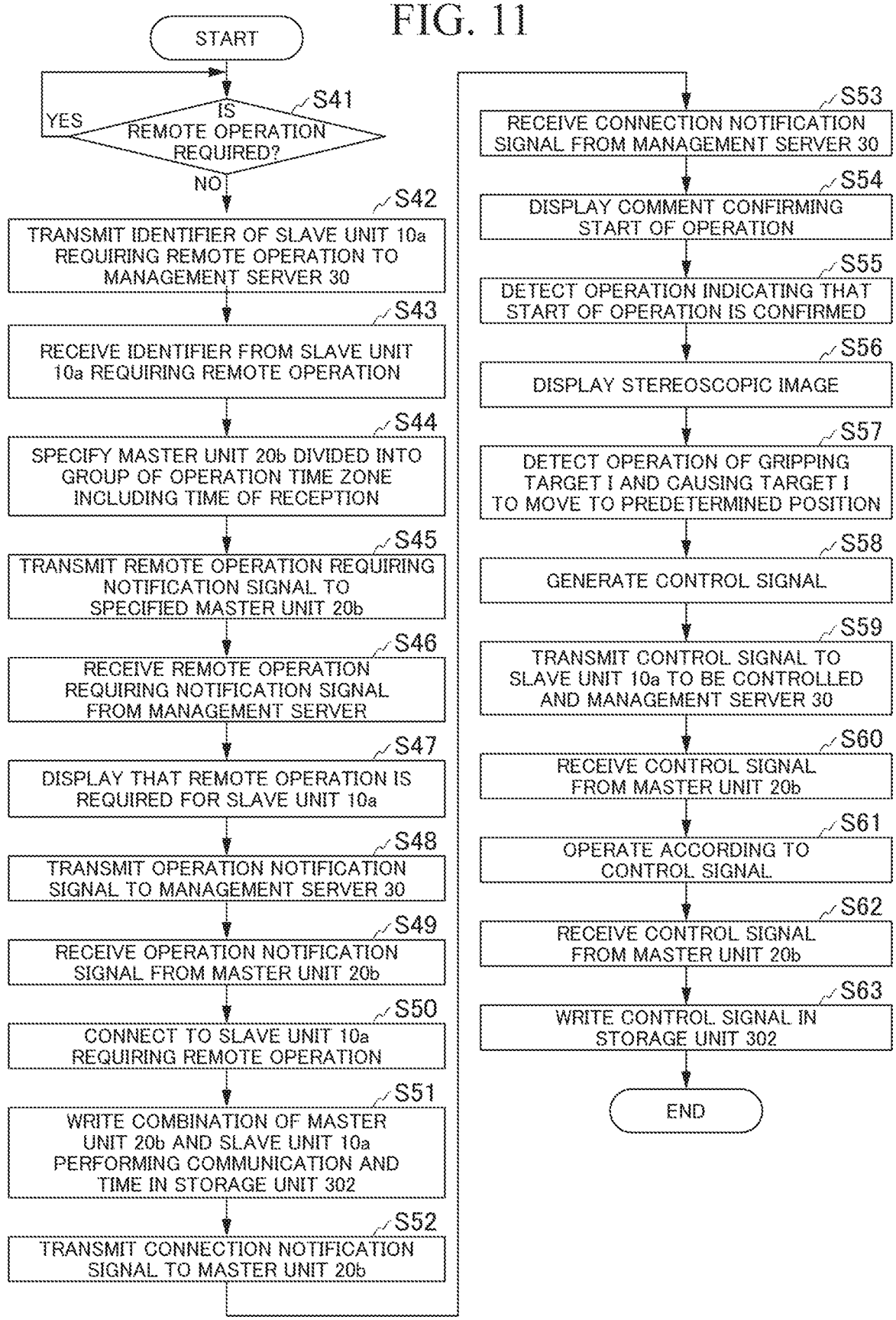
FIG. 11 is a diagram which shows an example of a processing flow of the management system according to the third embodiment of the present invention.

Here, a processing flow of the management system 1 according to the third embodiment of the present invention shown in FIG. 11 will be described.

The remote operation requiring detection unit 105 of each slave unit 10a determines at predetermined time intervals (for example, 100 ms) whether a remote operation is not required at the time of determination (step S41).

When the remote operation requiring detection unit 105 determines that a remote operation is not required (YES in step S41), the procedure returns to the processing of step S41.

When the remote operation requiring detection unit 105 determines that a remote operation is required (NO in step S41), the remote operation requiring detection unit 105 transmits an identifier of the slave unit 10a requiring a remote operation to the management server 30 (step S42).

The operation management unit 303 receives the identifier from the slave unit 10a requiring a remote operation (step S43). If the identifier is received, the operation management unit 303 specifies the master unit 20b in the storage unit 302, which is divided into a group of an operation time zone including a time of the reception (step S44). The operation management unit 303 transmits a remote operation requiring notification signal for notifying that a remote operation is required to the specified master unit 20b via the communication unit 301 (step S45).

The image reproduction unit 202 of each specified master unit 20b receives the remote operation requiring notification signal from the management server 30 via the communication unit 201 (step S46). Each image reproduction unit 202 displays that a remote operation is required for the slave unit 10a when the remote operation requiring notification signal is received (step S47).

An operator who operates each master unit 20b views a fact that a remote operation for a slave unit 10a displayed by the image reproduction unit 202 is required and, when the operator determines to perform an operation of operating the slave unit 10a and causing the target I to move, the operator performs an operation for notifying that the slave unit 10a will be operated on, for example, the operation input unit 203.

The operation input unit 203 transmits an operation notification signal for notifying that the slave unit 10a is operated to the management server 30 according to an operation performed by an operator (step S48). The operation notification signal includes the identifier of the master unit 20b from which it is transmitted.

The operation management unit 303 receives an operation notification signal from the master unit 20b via the communication unit 301 (step S49).

The operation management unit 303 connects the master unit 20b of the identifier included in the operation notification signal received first to the slave unit 10a requiring a remote operation (step S50). The operation management unit 303 writes the combination of the master unit 20b and the slave unit 10a performing communication and a time in the storage unit 302 (step S51). The operation management unit 303 transmits a connection notification signal for notifying a connection to the slave unit 10a requiring a remote operation to the master unit 20b of the identifier included in the operation notification signal received first (step S52).

The image reproduction unit 202 of the master unit 20b which has transmitted an operation notification signal first receives a connection notification signal from the management server 30 via the communication unit 201 (step S53). The image reproduction unit 202 displays a comment that confirms a start of an operation when the connection notification signal is received (step S54).

An operator who has viewed the comment that confirms a start of an operation performs an operation indicating that the start of an operation is confirmed (for example, an operation of pressing a "confirmation" button) on the operation input unit 203.

The operation input unit 203 detects the operation indicating that the start of an operation by an operator is confirmed (step S55). When the operation input unit 203 detects the operation indicating that the start of an operation by an operator is confirmed, the image reproduction unit 202 displays a three-dimensional image photographed by the photographer 102 of the slave unit 10a to be controlled (step S56).

The operator performs an operation of gripping the target I and causing it to move to a predetermined position on the operation input unit 203 while viewing the three-dimensional image displayed by the image reproduction unit 202.

The operation input unit 203 detects the operation of gripping the target I and causing it to move to a predetermined position by an operator (step S57). The operation input unit 203 generates a control signal in accordance with the detected operation performed by an operator (step S58). The operation input unit 203 transmits the generated control signal to the slave unit 10a to be controlled and the management server 30 (step S59). The operation input unit 203 generates a control signal in real time in accordance with the operation performed by an operator, and transmits the generated control signal to the slave unit 10a to be controlled and the management server 30 each time it is generated.

The gripping unit 103 receives a control signal from the master unit 20*b* (step S60). The gripping unit 103 operates according to the received control signal (step S61).

The operation management unit 303 receives a control signal from the master unit 20*b* (step S62). The operation management unit 303 writes the received control signal in the storage unit 302 as learning data for an input of image information and the like by artificial intelligence AI provided in the slave unit 10*a* (step S63).

As described above, the storage unit 302 according to the third embodiment of the present invention stores each time zone and the identifiers of master units 20*b* operated by the operators divided into groups corresponding to each time zone in association with each other. When the identifier from a slave unit 10*a* requiring a remote operation is received, the operation management unit 303 specifies a master unit 20*b* divided in a group of an operation time zone including a time of the reception in the storage unit 302. The operation management unit 303 transmits a remote operation requiring notification signal for notifying that a remote operation is required to the specified master unit 20*b* via the communication unit 301.

Therefore, the management system 1 according to the third embodiment of the present invention can employ an operator without worrying about a workplace of the operator for each operation time zone and can easily secure a labor force. In addition, although an operation of the slave unit 10*a* is performed at night in a place where it is installed, operators who operate the master unit 20*b* in countries where each operation time is daytime are employed, and thereby the operators can easily work and a labor force as the operators can be easily secured.

In another embodiment of the present invention, the storage unit 302 stores each time zone, the identifiers of master units 20*b* operated by operators divided into groups corresponding to each time zone, and furthermore, operation proficiency of each operator in association with each other. Then, when a remote operation is required for the slave unit 10*a* in each time zone, the management system 1, like the management system 1 according to the first embodiment of the present invention, may connect the master unit 20*b* operated by an operator to the slave unit 10*a* according to the operation proficiency of the operator.

When a remote operation is required for the slave unit 10*a* in each time zone, the management system 1 according to another embodiment of the present invention, like the management system 1 according to the second embodiment of the present invention, when it is determined that a distance from the target I to the slave unit 10*a* is long, may change the connection destination of the master unit 20*b* to a slave unit 10*a* closer to the target I.

Fourth Embodiment (Configuration of Management System 1)

A configuration of a management system 1 according to a fourth embodiment of the present invention will be described.

The management system 1 according to the fourth embodiment of the present invention is a system in which one master unit 20 switches among slave units 10 to be operated and a slave unit 10 that performs an operation of gripping the target I by means of semi-autonomous control and causing the target I to move to a predetermined position supports a slave unit 10 that has difficulty moving the target I. In the semi-autonomous control, autonomous control is performed using a control signal generated according to artificial intelligence AI on an input such as image information when a remote operation is not required, and control by an operator is performed when a movement of the target I is difficult by means of autonomous control.

Figure 12:
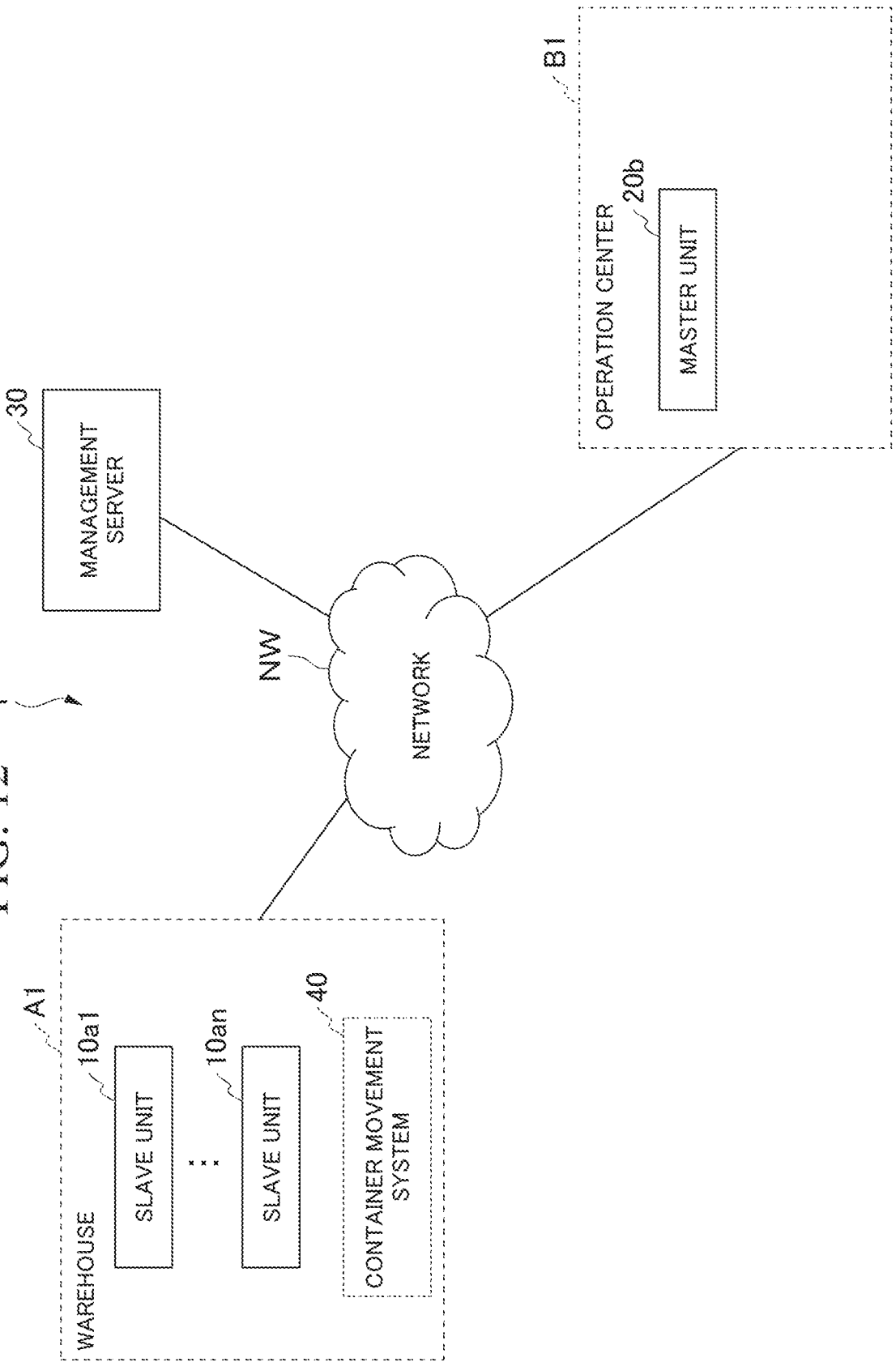
FIG. 12 is a diagram which shows an example of a configuration of a management system according to a fourth embodiment of the present invention.

The management system 1 according to the fourth embodiment of the present invention, as shown in FIG. 12, includes a plurality of slave units 10*a*1 to 10*an*, the master unit 20*b*, the management server 30, the container movement system 40, and the network NW. In the following description, the slave units 10*a*1 to 10*an* are collectively referred to as the slave unit 10*a*.

(Configuration of Slave Unit 10*a*).

Each slave unit 10*a* is a robot disposed in a place different from the master unit 20*b* (the warehouse A1 in the example shown in FIG. 12).

Each slave unit 10*a* grips the target I and causes the gripped target I to move to a predetermined position according to semi-autonomous control.

When there is a slave unit 10*a* which has difficulty moving the target I among the plurality of slave units 10*a*, the master unit 20*b* is connected to the slave unit 10*a* which has difficulty moving the target I via the network NW. The slave unit 10*a* to which the master unit 20*b* is connected operates according to a control signal received from the master unit 20*b* via the network NW. When the slave unit 10*a* receives a control signal from the master unit 20*b*, and the slave unit 10*a* operates according to the control signal, the slave unit 10*a* and the master unit 20*b* constitute the master/slave type remote work system.

The slave unit 10*a* includes, like the slave unit 10*a* according to the third embodiment, the communication unit 101, the photographer 102, the gripping unit 103, the semi-autonomous controller 104, and the remote operation requiring detection unit 105.

The communication unit 101 communicates with the master unit 20*b* via the network NW. The communication unit 101 communicates with the master unit 20*b*, and the slave unit 10*a* and the master unit 20*b* constitute the master/slave type remote work system.

The photographer 102 photographs the target I to be gripped. An image photographed by the photographer 102 is a three-dimensional image in which an object is three-dimensionally viewed. The photographer 102 transmits the photographed image to the master unit 20*b* via the communication unit 101.

The gripping unit 103 operates according to a control signal received from the semi-autonomous controller 104 when a remote operation is not required. In addition, the gripping unit 103 operates according to a control signal received from the master unit 20*b* via the communication unit 101 when a remote operation is required.

The semi-autonomous controller 104 generates a control signal on the basis of, for example, artificial intelligence AI and outputs the generated control signal to the gripping unit 103 when a remote operation is not required.

The remote operation requiring detection unit 105 detects that the gripping unit 103 has difficulty moving the target I. Specifically, the remote operation requiring detection unit 105 specifies a position of the gripping unit 103 and a position of the target I in the image photographed by the photographer 102. Then, the remote operation requiring detection unit 105 determines whether a relative distance between the position of the gripping unit 103 and the position of the target I is equal to or greater than a threshold value for determining that the target I is not gripped until the target I reaches a predetermined position. The remote operation requiring detection unit 105 determines that a movement of the target I is difficult, that is, a remote operation is required (when a remote operation is required) when it is determined that the relative distance between the position of the gripping unit 103 and the position of the target I is equal to or greater than the threshold value. In addition, the remote operation requiring detection unit 105 determines that a remote operation is not required when it is determined that the relative distance between the position of the gripping unit 103 and the position of the target I is less than the threshold value.

The remote operation requiring detection unit 105 transmits the identifier of the slave unit 10a requiring a remote operation to the management server 30 via the communication unit 101 when it is determined that a remote operation is required.

(Configuration of Master Unit 20b)

The master unit 20b is disposed in a place different from the slave unit 10a (an operation center B1 that is a workplace of the operator in the example of FIG. 12).

When a remote operation is required, the master unit 20b transmits a control signal to the slave unit 10a that requires the remote operation via the network NW.

The master unit 20b, like the master unit 20 according to the first embodiment of the present invention, includes the communication unit 201, the image reproduction unit 202, and the operation input unit 203.

The communication unit 201 communicates with the slave unit 10a and the management server 30 via the network NW.

When the combination of the master unit 20b and the slave unit 10a performing communication is changed, respective identifiers are stored together with a time of the change.

The image reproduction unit 202 receives the three-dimensional image from the slave unit 10a to be operated via the communication unit 201. In addition, the image reproduction unit 202 receives a remote operation requiring notification signal from the management server 30 via the communication unit 201 when the remote operation requiring detection unit 105 determines that a remote operation is required.

The image reproduction unit 202 displays the received three-dimensional image. In addition, the image reproduction unit 202 displays that a remote operation is required for the slave unit 10a when a remote operation requiring notification signal is received from the management server 30 via the communication unit 201.

The operation input unit 203 detects an operation performed by the operator, and transmits a control signal in accordance with the detected operation to the slave unit 10a to be operated and the management server 30 via the communication unit 201.

(Configuration of Management Server 30)

The management server 30, like the management server 30 according to the first embodiment of the present invention, includes the communication unit 301, the storage unit 302, and the operation management unit 303.

The communication unit 301 communicates with the master unit 20b and the container movement system 40 via the network NW.

The storage unit 302 stores a combination of the master unit 20b and the slave unit 10a connected via the network NW in association with respective identifiers. When the combination of the master unit 20b and the slave unit 10a performing communication is changed, the storage unit 302 stores respective identifiers together with a time of the change.

The operation management unit 303 switches among the master units 20b to be controlled each time a remote operation is required for any of the slave units 10a. Specifically, the operation management unit 303 connects the master unit 20b and a slave unit 10a requiring a remote operation.

(Processing of Management System 1)

Next, processing of the management system 1 according to the fourth embodiment of the present invention will be described.

Figure 13:
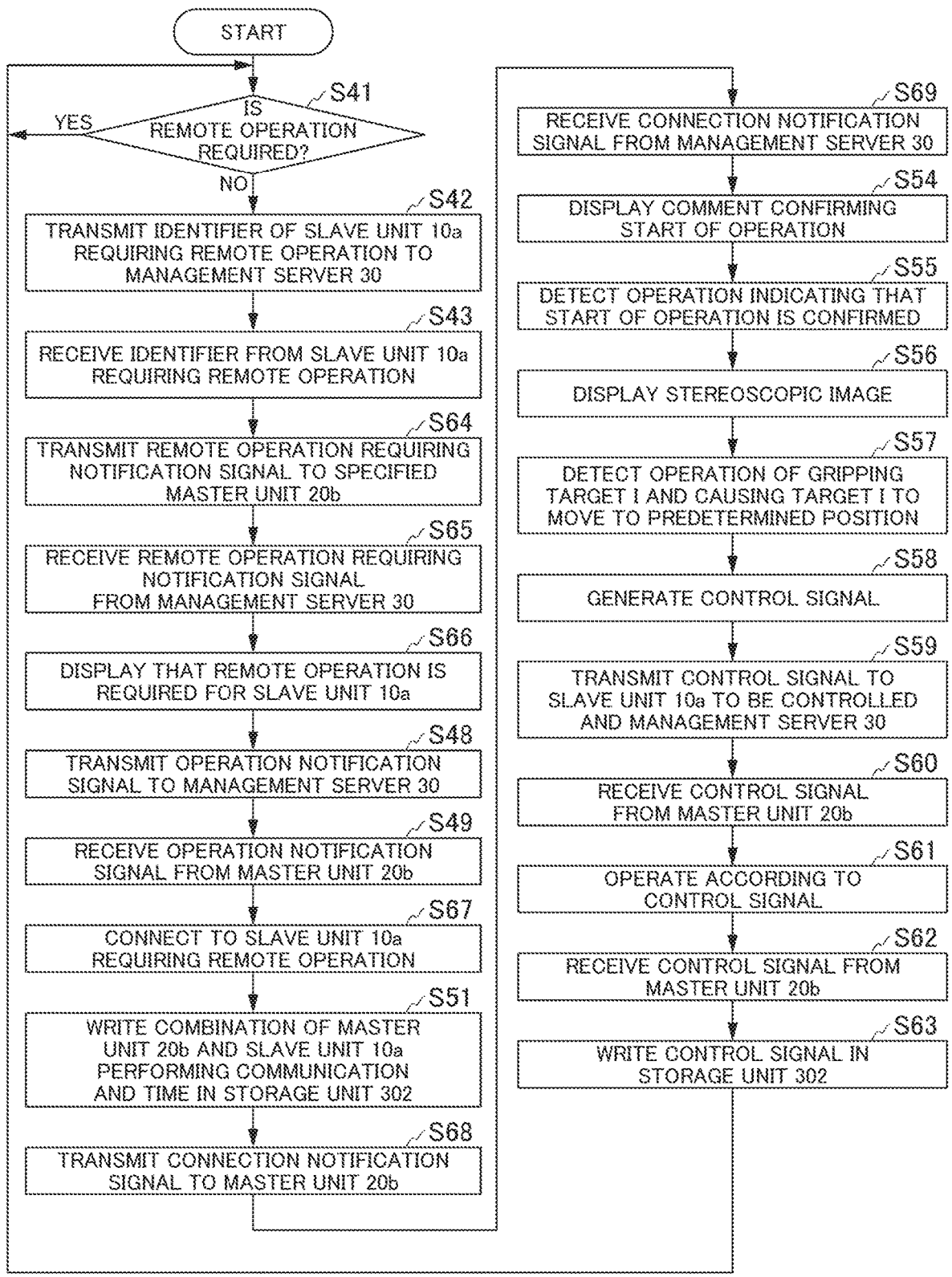
FIG. 13 is a diagram which shows an example of a processing flow of the management system according to the fourth embodiment of the present invention.

Here, a processing flow of the management system 1 according to the fourth embodiment of the present invention shown in FIG. 13 will be described.

The management system 1 performs processing of steps S41 to S43.

The operation management unit 303 transmits a remote operation requiring notification signal for notifying that a remote operation is required to the master unit 20b via the communication unit 301 when the identifier is received (step S64).

The image reproduction unit 202 of the master unit 20b receives the remote operation requiring notification signal from the management server 30 via the communication unit 201 (step S65). The image reproduction unit 202 displays that a remote operation is required for the slave unit 10a when the remote operation requiring notification signal is received (step S66).

An operator who operates the master unit 20b views a fact that a remote operation for the slave unit 10a is required, which is displayed by the image reproduction unit 202 and, when the operator determines to perform an operation of operating the slave unit 10a and causing the target I to move, the operator performs an operation for notifying that the slave unit 10a will be operated on, for example, the operation input unit 203.

The operation input unit 203 transmits an operation notification signal for notifying that the slave unit 10a will be operated to the management server 30 according to an operation performed by the operator (step S48). The operation notification signal includes the identifier of the master unit 20b from which it is transmitted.

The operation management unit 303 receives the operation notification signal from the master unit 20b via the communication unit 301 (step S49).

The operation management unit 303 connects the master unit 20b to the slave unit 10a requiring a remote operation (step S67). The operation management unit 303 writes the combination of the master unit 20b and the slave unit 10a performing communication and a time in the storage unit 302 (step S51). The operation management unit 303 transmits a connection notification signal for notifying a connection to the slave unit 10a requiring a remote operation to the master unit 20b (step S68).

The image reproduction unit 202 of the master unit 20b receives the connection notification signal from the management server 30 via the communication unit 201 (step S69).

The management system 1 performs the processing of steps S54 to S59. The operation input unit 203 generates a control signal in real time according to an operation performed by the operator. The operation input unit 203 transmits the generated control signal to the slave unit 10a to be controlled and the management server 30 each time the control signal is generated.

The management system 1 performs the processing of steps S60 to S63 and returns to the processing of step S41.

As described above, when the identifier from a slave unit 10a requiring a remote operation is received, the operation management unit 303 according to the fourth embodiment of the present invention transmits a remote operation requiring notification signal for notifying that the remote operation is required to the master unit 20b via the communication unit 301. The management system 1 returns to determine whether the remote operation is not required.

Therefore, in the management system 1 according to the fourth embodiment of the present invention, each time a remote operation is required for any of the slave units 10a, one master unit 20b is connected to the slave unit 10a. For this reason, one master unit 20b is connected to a plurality of slave units 10a and one operator operates the plurality of slave units 10a, thereby reducing labor cost. Specifically, when one operator operates five slave units 10a, the labor cost can be reduced to one-fifth as compared to the management system 1 in which the master unit 20b corresponds one-to-one with the slave unit 10a.

Figure 14:
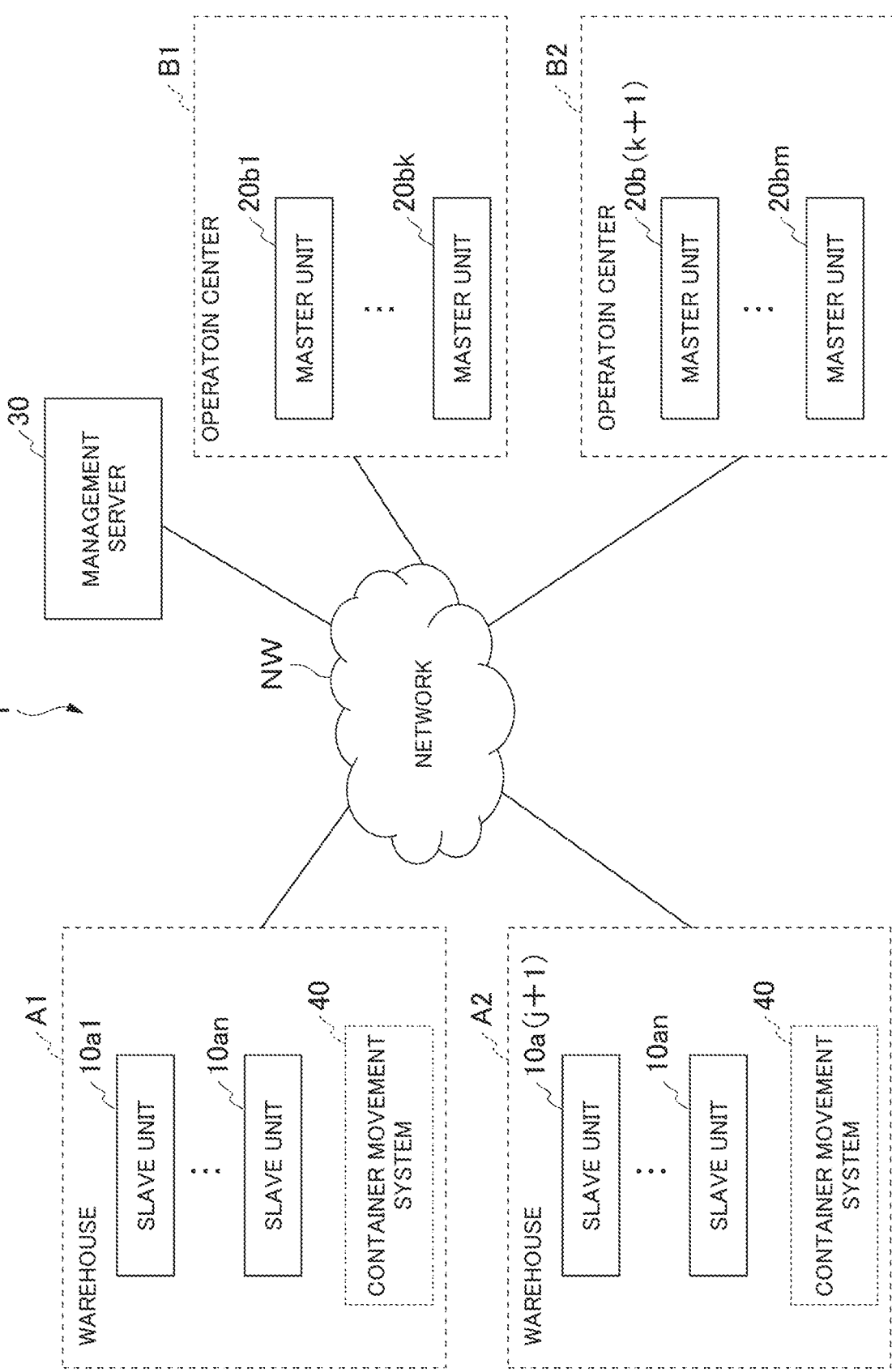
FIG. 14 is a diagram which shows an example of a configuration of a management system according to another embodiment of the present invention.

In the management system 1 according to another embodiment of the present invention, as shown in FIG. 14, the slave units 10a1 to 10an may be distributed and disposed in a plurality of warehouses (warehouses A1 and A2 in the example shown in FIG. 14) in different places. In addition, in the management system 1 according to another embodiment of the present invention, as shown in FIG. 14, the master units 20b1 to 20bm may be distributed and disposed in a plurality of operation centers (operation centers B1 and B2 in the example shown in FIG. 14) in different places, and each of the master units 20b1 to 20bm, like the master unit 20b according to the fourth embodiment of the present invention, may be connected to the plurality of slave units 10a. Different places may be any places such as different countries or different areas in the same country. In addition, each of the master units 20b1 to 20bm is not necessarily disposed in an operation center, but may be disposed, for example, in an operator's home or warehouse.

In another embodiment of the present invention as shown in FIG. 14, the storage unit 302 stores the identifier of a master unit 20b operated by an operator and the operation proficiency of the operator in association with each other. Then, when a remote operation is required for a slave unit 10a, the management system 1, like the management system 1 according to the first embodiment of the present invention, may connect the master unit 20b operated by the operator to the slave unit 10a according to the operation proficiency of the operator.

When a remote operation is required for the slave unit 10a, the management system 1 according to another embodiment of the present invention as shown in FIG. 14, like the management system 1 according to the second embodiment of the present invention, when it is determined that a distance from the target I to the slave unit 10a is long, may change the connection destination of the master unit 20b to a slave unit 10a closer to the target I.

As an operation of gripping the target I, which is performed by the management system 1 according to each embodiment of the present invention, an example in which the target I is gripped in a warehouse has been described. However, the operation of gripping the target I, which is performed by the management system 1 according to each embodiment of the present invention, is not limited to an operation of gripping the target I in a warehouse. The operation of gripping the target I, which is performed by the management system 1 according to another embodiment of the present invention, is not limited to an operation in a warehouse, and may be an operation of gripping the target I in offices, supermarkets, hospitals, libraries, laboratories, and the like, or may also be an operation of performing other remote operations such as seeding, sorting, unpacking and packing, inspection, and assembly.

Each of the slave units 10 according to each embodiment of the present invention may also be disposed in each of two or more different places (for example, a warehouse A and a warehouse D).

In addition, each of the master units 20 according to each embodiment of the present invention may also be disposed in each of two or more different places (for example, an operation center B and an operation center E).

The processing of the management system 1 according to the first embodiment and the second embodiment of the present invention has been described as a movement of the container M storing the target I in the warehouse A to the position of the slave unit 10. However, the processing may be a movement of the slave unit 10 to the position of the container M. In addition, it may also be the movements of both the container M and the slave unit 10.

The storage unit 302 in each embodiment of the present invention and other storage units may be provided anywhere in a range in which appropriate transmission or reception of information is performed. In addition, a plurality of storage units 302 and other storage units may be present in the range in which appropriate transmission or reception of information is performed, and may store data in a distributed manner.

In the third embodiment of the present invention, a case "when a remote operation is required by means of semi-autonomous control" has been described as a case "when it is determined that a movement of the target I is difficult". However, in another embodiment of the present invention, a case "when a remote operation is required by means of semi-autonomous control" may include, for example, a case "when the operation is switched to an operator whose proficiency is higher (for example, higher score) than the semi-autonomous controller 104 that is currently controlling the operation", a case "when the operation is switched to an operator who can operate in an area apart from a place in which an operator who is currently performing the operation, that is, an operator in a different operation time zone", and the like.

In the processing flow in the embodiments of the present invention, an order of processing may be changed within a range in which appropriate processing is performed.

Each of the storage unit in the embodiments of the present invention and a storage device (including a register and a latch) may be provided anywhere in a range in which appropriate transmission or reception is performed. In addition, a plurality of storage units and storage devices may be present in the range in which appropriate transmission or reception is performed, and may store data in a distributed manner.

Although the embodiments of the present invention have been described, the slave unit 10a, the master unit 20b, the management server 30, the container movement system 40, and other control devices described above may have a computer system therein. Then, a procedure of the processing described above is stored in a computer-readable recording medium in a form of program and the processing described above is performed by a computer reading and executing this program. A specific example of the computer is shown as follows.

Figure 15:
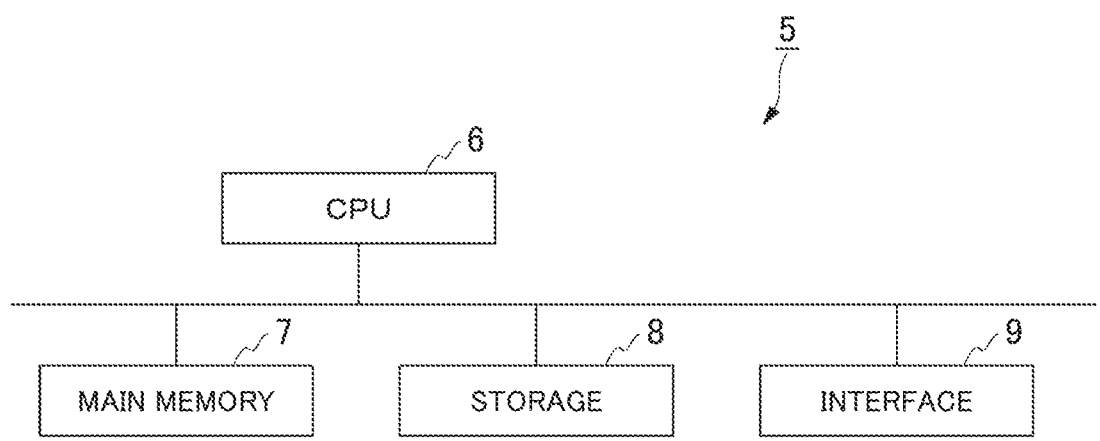
FIG. 15 is a schematic block diagram which shows a configuration of a computer according to at least one embodiment.

FIG. 15 is a schematic block diagram which shows a configuration of a computer according to at least one embodiment.

A computer 5 includes, as shown in FIG. 15, a CPU 6, a main memory 7, a storage 8, and an interface 9.

For example, each of the slave unit 10a, the master unit 20b, the management server 30, the container movement system 40, and the other control devices described above is mounted on a computer 5. Then, an operation of each processing unit described above is stored in the storage 8 in the form of program. The CPU 6 reads the program from the storage 8 to load it in the main memory 7, and executes the processing according to this program. In addition, the CPU 6 secures a storage region corresponding to each storage unit described above in the main memory 7 according to the program.

Examples of the storage 8 include a hard disk drive (HDD), a solid state drive (SSD), a magnetic disk, a magneto-optical disc, a compact disc read only memory (CD-ROM), a digital versatile disc read only memory (DVD-ROM), a semiconductor memory, and the like. The storage 8 may be an internal medium directly connected to a bus of the computer 5 or may also be an external medium connected to the computer 5 via an interface 9 or a communication line. In addition, when this program is distributed to the computer 5 through a communication line, the computer 5 that has received the distributed program may load this program in the main memory 7 and execute the processing described above. In at least one embodiment, the storage 8 is a non-transitory tangible storage medium.

In addition, the program described above may realize some of the functions described above. Furthermore, the program described above may be a file that can realize the functions described above in combination with a program already recorded in a computer system, a so-called difference file (difference program).

Although several embodiments of the present invention have been described, these embodiments are examples and are not intended to limit the scope of the invention. In these embodiments, various additions, various omissions, various replacements, and various changes may be made within a range not departing from the gist of the invention.

INDUSTRIAL APPLICABILITY

According to the aspects of the present invention, in a management system including a remote work system having a master unit and a slave unit that can be remotely operated and a management server, it is possible to connect the master unit and the slave unit to improve work efficiency.

REFERENCE SIGNS LIST

1 Management system
5 Computer
6 CPU
7 Main memory
8 Storage
9 Interface
10 Slave unit
20 Master unit
30 Management server
40 Container movement system
101, 201, 301 Communication unit
102 Photographer
103 Gripping unit
104 Semi-autonomous controller
105 Remote operation requiring detection unit
202 Image reproduction unit
203 Operation input unit
302 Storage unit
303 Operation management unit
401 Movement controller
I Target
M Container
NW Network
T Mechanism

The invention claimed is:

1. A management system comprising:
at least one master unit including a communication unit, an image reproduction unit, and an operation input unit that receives an operation of an operator, a plurality of robots that receive a first control signal from the at least one master unit, and a management server,
wherein the management server includes:
an operation management unit, a portion of the management server, transmits a connection instruction signal for causing the at least one master unit to communicate with one of the plurality of robots and determines whether an operation proficiency of the operator operating the at least one master unit is less than a degree of difficulty in the operation in accordance with a shape of a target to be gripped by the robot and a posture of the target when it is gripped by the robot,
the operation management unit not switching the at least one master unit controlling the robot by determining that the target is easy for the robot to grip when it is determined that the operation proficiency of the operator is more than the degree of difficulty in the operation, and
the operation management unit switching the at least one master unit controlling the robot to at least one master unit being operated by another operator having an operation proficiency equal to or greater than the degree of difficulty in the operation when it is determined that the operation proficiency of the operator is less than the degree of difficulty in the operation,
the at least one master unit includes:
the communication unit that communicates with one of the plurality of robots via a network in accordance with the connection instruction signal; and
an operation input unit that detects the operation performed by the operator and transmits the first control signal to the one of the plurality of robots via the communication unit in accordance with the operation, and
each of the plurality of robots includes:
a robot arm that operates in accordance with the first control signal received from the at least one master unit when communicating with the at least one master unit.

2. The management system according to claim 1,
wherein at least one of the plurality of robots includes:
a remote operation requiring detection unit that transmits an identifier thereof to the management server when the operation requires a remote operation, the remote operation requiring detection unit being a portion of the at least one of the plurality of robots; and
a semi-autonomous controller that generates a second control signal and controls the robot arm using the generated second control signal when the operation does not require the remote operation.

3. The management system according to claim 1,
wherein the at least one master unit is one of a plurality of master units,
the plurality of master units located at a plurality of locations is divided into a plurality of groups according to an operation time zone, and the operation management unit causes the at least one master unit located in one of the plurality of locations, which is grouped, to communicate with the one of the plurality of robots.

4. The management system according to claim 1, wherein the operation management unit causes the at least one master unit to communicate with the one of the plurality of robots on the basis of the operation proficiency of the operator operating the at least one master unit.

5. A control method of a management system including at least one master unit that receives an operation of an operator, a plurality of robots, and a management server, comprising:
- transmitting, by the management server, a connection instruction signal for causing the at least one master unit to communicate with one of the plurality of robots;
- communicating, by the at least one master unit, with one of the plurality of robots in accordance with the connection instruction signal and transmitting a first control signal to the one of the plurality of robots in accordance with the operation;
- determining, by a portion of the management server, whether an operation proficiency of the operator operating the at least one master unit is less than a degree of difficulty in the operation in accordance with a shape of a target to be gripped by the robot and a posture of the target when it is gripped by the robot,
- not switching the at least one master unit controlling the robot by determining that the target is easy for the robot to grip when it is determined that the operation proficiency of the operator is more than the degree of difficulty in the operation,
- switching the at least one master unit controlling the robot to at least one master unit being operated by another operator having an operation proficiency equal to or greater than the degree of difficulty in the operation when it is determined that the operation proficiency of the operator is less than the degree of difficulty in the operation, and
- operating, by each of the plurality of robots, in accordance with the first control signal received from the at least one master unit when communicating with the at least one master unit.

\* \* \* \* \*